United States Patent
Cai et al.

(10) Patent No.: US 9,775,121 B1
(45) Date of Patent: Sep. 26, 2017

(54) DYNAMIC CONTROL OF REFERENCE-SIGNAL TRANSMISSION POWER BASED ON REFERENCE SIGNAL COVERAGE QUALITY AT OR NEAR HALF-WAY POINT BETWEEN BASE STATIONS

(71) Applicant: Sprint Spectrum L.P., Overland Park, KS (US)

(72) Inventors: Zheng Cai, Fairfax, VA (US); Zheng Fang, Mclean, VA (US); Yu Wang, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/409,969

(22) Filed: Jan. 19, 2017

(51) Int. Cl.
| | |
|---|---|
| *H04W 52/14* | (2009.01) |
| *H04W 52/32* | (2009.01) |
| *H04L 5/00* | (2006.01) |
| *H04W 36/08* | (2009.01) |
| *H04W 64/00* | (2009.01) |

(52) U.S. Cl.
CPC ......... *H04W 52/325* (2013.01); *H04L 5/0048* (2013.01); *H04W 36/08* (2013.01); *H04W 64/003* (2013.01)

(58) Field of Classification Search
CPC .............................. H04W 52/14; H04W 24/00
USPC ......... 455/522, 69, 456.1, 456.5, 67.11, 509, 455/452.1
See application file for complete search history.

(56) References Cited

U.S. PATENT DOCUMENTS

| | | | |
|---|---|---|---|
| 2003/0199269 A1 | 10/2003 | Tobe et al. | |
| 2007/0042784 A1 | 2/2007 | Anderson | |
| 2008/0200203 A1 | 8/2008 | Malladi et al. | |
| 2011/0113433 A1* | 5/2011 | Koyanagi | H04L 5/0039 718/104 |
| 2012/0275391 A1* | 11/2012 | Cui | H04W 72/1247 370/329 |
| 2013/0005388 A1* | 1/2013 | Naka | H04W 52/244 455/522 |
| 2013/0223307 A1* | 8/2013 | Ohlsson | H04W 52/0216 370/311 |
| 2015/0305035 A1 | 10/2015 | Hu et al. | |

* cited by examiner

*Primary Examiner* — John J Lee (57) ABSTRACT

A method and system to help manage reference-signal transmission power. A base station's reference-signal transmission power will be adjusted based on consideration of the coverage quality of one or more WCDs that are located at or near a mid-point between the base station and an adjacent other base station. In particular, if a threshold extent of coverage quality reports for the base station's reference signal received at or near the mid-point are threshold low, then the serving base station could responsively increment its reference-signal transmission power and/or responsively cause the adjacent base station to decrement its reference-signal transmission power. Whereas, if a threshold extent of such coverage quality reports are threshold high, then the serving base station could responsively decrement its reference-signal transmission power and/or responsively cause the adjacent base station to increment its reference signal transmission power.

20 Claims, 6 Drawing Sheets

DYNAMIC CONTROL OF REFERENCE-SIGNAL TRANSMISSION POWER BASED ON REFERENCE SIGNAL COVERAGE QUALITY AT OR NEAR HALF-WAY POINT BETWEEN BASE STATIONS

BACKGROUND

A typical wireless communication system includes a number of base stations each radiating to provide coverage in which to serve wireless communication devices (WCDs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a WCD within coverage of the system may engage in air interface communication with a base station and may thereby communicate via the base station with various remote network entities or with other WCDs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1xRTT and 1xEV-DO), Global System for Mobile Communications (GSM), IEEE 802.11 (WIFI), and BLUETOOTH. Each protocol may define its own procedures for registration of WCDs, initiation of communications, handover between base station coverage areas, and other functions.

Further, each base station may provide wireless service to WCDs on one or more carrier frequencies, with the air interface defining various downlink and uplink channels. For instance, on the downlink, the air interface may define a reference channel for carrying a reference signal (also referred to as a pilot signal, or by other names) that WCDs can measure to evaluate base station coverage quality, the air interface may define various other downlink control channels for carrying control signaling to WCDs, and the air interface may define one or more downlink traffic channels for carrying bearer data and other information to WCDs. And on the uplink, the air interface may define an access channel for carrying WCD access requests to the base station, the air interface may define one or more other uplink control channels for carrying control signaling to the base station, and the air interface may define one or more uplink traffic channels for carrying bearer data and other information to the base station.

When a WCD initially enters into coverage of such a system, the WCD may scan for a best base station coverage area in which to operate, and the WCD may then engage in signaling with and via the base station, to register for service. In particular, the WCD may evaluate a reference signal receive quality (RSRQ) of each base station reference signal that the WCD detects, where the RSRQ defines a signal-to-noise ratio of the reference signal (e.g., a ratio of reference signal receive power to noise power, also referred to as SINR, SNR, C/I, Ec/Io, or by other names), and the WCD may select the coverage area having the highest RSRQ. Alternatively or additionally, the WCD may evaluate another coverage quality metric, such as reference signal receive power (RSRP), of each base station reference signal, and the WCD may select the coverage area having the best (e.g., highest) such metric, perhaps in combination with the highest RSRQ. The WCD may then engage in signaling with the associated base station, to register for service.

The WCD may then be served by the base station in a connected state or an idle state. In the connected state, the WCD would have an established radio-link-layer connection with the base station through which the WCD and base station could exchange bearer data (e.g., application-layer communications), facilitating communication by the WCD on an external transport network for instance. And in the idle state, the WCD would not have an established radio-link-layer connection with the base station but may periodically check for paging from the base station and may transition to the connected mode when necessary to engage in bearer communication.

When so served, the WCD may also regularly monitor the quality of coverage from its serving base station and from any adjacent base stations (e.g., base stations providing coverage overlapping with that of the serving base station), to help ensure that the WCD is served with suitable coverage and perhaps with the best available coverage. In particular, the WCD may regularly evaluate coverage quality (e.g., RSRQ and/or one or more other coverage quality metrics) from its serving base station and coverage quality from each adjacent base station. And if the coverage quality from the WCD's serving base station becomes threshold low and the coverage quality from an adjacent base station becomes threshold high (e.g., threshold higher than from the serving base station), then the WCD may hand over to be served by the adjacent base station.

Overview

In operation, a base station will be configured to transmit its reference signal at a power level that, along with other factors, contributes to define an effective distance or range of the base station's coverage, within which WCDs can detect the reference signal and evaluate coverage quality. All other factors being equal, a base station's use of higher reference-signal transmission power would provide a wider effective range of coverage, and the base station's use of lower reference-signal transmission power would provide a narrower effective range of coverage.

Given this, as a wireless service provider deploys base stations in its network, the service provider may set the reference-signal transmission power of each base station at a level that would provide a desired range of coverage. In particular, the service provider may set the reference-signal transmission power of each base station at a level that would provide usefully wide coverage, overlapping sufficiently with coverage of one or more other base stations so as to allow seamless WCD handover between coverage areas, but not overlapping so much as to create undue interference between coverage areas.

Thus, if a service provider deploys a base station at a location that is distant from other base stations, the service provider may set the base station's reference-signal transmission power at a relatively high level, to provide a relatively wide range of coverage. Whereas, if the service provider deploys a base station at a location that is near one or more other base stations, such as to fill in a coverage gap, the service provider may set the base station's reference-signal transmission power at a relatively low level, to provide a suitable but relatively narrow range of coverage.

Unfortunately, however, as a service provider adds more and more base stations to its network or as configurations or environments of base stations change, it may be inconvenient or impractical for the service provider to provision and maintain each base station's reference-signal transmission power at an appropriate level. Without limitation, this could be a particular issue as a service provider deploys small cell base stations (small cells) throughout its network to help improve in-building coverage, to fill in coverage holes, to serve densely-populated urban areas, or for other reasons. As a service provider deploys many small cells within a region, the result could be varying adjacency of small cells and varying levels of coverage overlap and interference.

One way to help manage this situation is to configure base stations to automatically set and adjust their reference-signal transmission power based on consideration of how far they are from adjacent base stations, such that their respective coverage areas each extent do just over half-way between the base stations. For instance, each base station could be programmed to (i) detect the presence of an adjacent other base station, (ii) determine the distance between itself and the adjacent base station, and (iii) based on standard radio frequency propagation models, set its reference-signal transmission power to a level that should result in reference-signal propagation to over half-way between it and the adjacent base station.

This approach may work reasonably well to set each base station's reference-signal transmission power. Unfortunately, however, the approach may not adequately account for various other factors impacting reference-signal quality at the outer edge of each base station's coverage. For example, the approach may not adequately account for the level of noise at the coverage edge, such as noise from one or more adjacent base stations or other factors. Consequently, WCDs that are served by a base station and are located at or near the base station's coverage edge may experience undesirably low RSRQ, which could lead to poor user experience and other issues, or unnecessarily high RSRQ, which could suggest that the base station's reference signal is too strong (and may unduly interfere with adjacent coverage). An improvement is therefore desired.

Disclosed herein is an improved method and system to help manage reference-signal transmission power. In accordance with the disclosure, a base station's reference-signal transmission power will be adjusted based on consideration of the coverage quality experienced by one or more WCDs that are located at or near the half-way point between the base station and an adjacent other base station. In particular, if a threshold extent of coverage quality reports for the base station's reference signal received at or near the half-way point are threshold low, then the serving base station could responsively increment its reference-signal transmission power and/or responsively cause the adjacent base station to decrement its reference-signal transmission power. Whereas, if a threshold extent of such coverage quality reports are threshold high, then the serving base station could responsively decrement its reference-signal transmission power and/or responsively cause the adjacent base station to increment its reference signal transmission power.

By keying this process specifically to the coverage quality experienced by one or more WCDs located at or near the half-way point between the base stations, the process can help to fairly maintain that mid-point as an approximate coverage edge.

Accordingly, in one respect, disclosed is a method for controlling reference-signal transmission power of a first base station. In accordance with the disclosure, the method involves the first base station detecting operation of an adjacent second base station, such as by receiving from each of one or more WCDs served by the first base station a report indicating that the WCD(s) detected coverage of the second base station. Further, the method involves adjusting the first base station's reference-signal transmission power based on coverage quality of (i.e., experienced by) one or more WCDs located at or near the mid-point between the first and second base stations.

In particular, the method involves determining a mid-point location that is half way between the first base station and the second base station, along a line extending from the first base station to the second base station. And the method involves identifying one or more WCDs served by the first base station, with the identifying being based on the each of the one or more WCDs being located within a predefined threshold distance of the determined mid-point location. Further, the method involves, based on coverage quality that the one or more identified WCD report for the reference signal from the first base station within the predefined threshold distance of the determined mid-point location, adjusting power of the first base station's reference-signal transmission.

In another respect, disclosed is method of controlling reference-signal transmission power in a communication system that includes a first base station and a second base station. In accordance with the disclosure, the method includes determining a location based on the location being half way between the first base station and the second base station along a line extending from the first base station to the second base station. Further, the method includes identifying one or more WCDs served by the first base station, with the identifying being based on the one or more WCDs being located within a predefined threshold distance of the determined location (not necessarily all at the same time). And the method includes, based on RSRQ from the first base station as reported by the identified one or more WCDs when so located within the predefined threshold distance of the determined location, triggering adjustment of reference-signal transmission power from at least one of the first base station or the second base station.

And in yet another respect, disclosed is a processing system in a wireless communication network, the network comprising a first base station and a second base station, where each of the first base station and second base station is configured to broadcast a respective reference signal. In accordance with the disclosure, the processing system is programmed to carry out operations including (i) determining a location based on the location being half way between the first base station and the second base station along a line extending from the first base station to the second base station, (ii) identifying one or more WCDs served by the first base station, with the identifying being based on the one or more WCDs being located within a predefined threshold distance of the determined location, and (iii) based on RSRQ from the first base station as reported by the identified one or more WCDs when so located within the predefined threshold distance of the determined location, adjusting reference-signal transmission power from at least one of the first base station or the second base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication network in which features of the present disclosure can be implemented. It should be understood, however, that this and other arrangements and operations described herein are provided by way of example and without limitation, and that numerous variations are possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
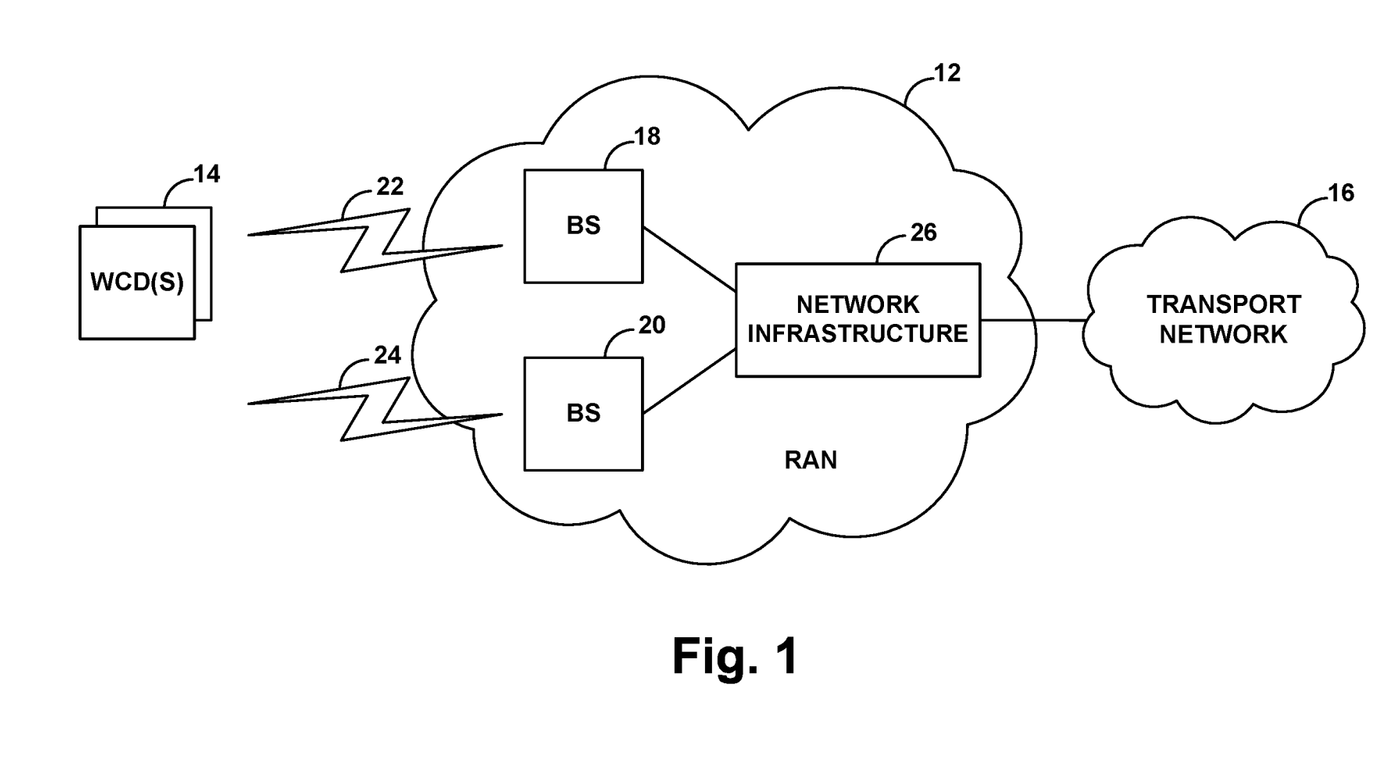
FIG. 1 is a simplified block diagram of an example wireless communication network in which features of the present disclosure can be implemented.

As shown in FIG. 1, the example wireless communication network includes a radio access network (RAN) 12 arranged to provide connectivity between WCD(s) 14 and a transport network 16 such as the PSTN or the Internet. In particular, the RAN includes two representative base stations (e.g., evolved Node-B's, base transceiver stations, access points, access nodes, etc.) 18, 20 radiating to provide respective coverage areas 22, 24 and each coupled with network infrastructure 26 that provides connectivity with the transport network 16. With this example arrangement, each WCD may thus be served by a base station and may thereby engage in communication on the transport network via an air interface between the WCD and the base station and via the network infrastructure connection between the base station and the transport network.

As discussed above, in operation, each such base station is configured to broadcast a reference signal to enable WCDs to detect and evaluate coverage quality. This reference signal could encode an identifier of the base station or its coverage area, and its broadcast can take various forms depending on the air interface protocol in use. For example, in an LTE network, the air interface on a given carrier frequency is divided over time and frequency into a recurring array of resource elements, and an LTE base station broadcasts its reference signal within particular ones of these resource elements every millisecond. Whereas, in a CDMA network, the air interface on a given carrier frequency is divided into a number of coded channels, and a CDMA base station continually broadcasts its reference signal (pilot signal) on a particular one of these channels.

To facilitate this reference signal broadcast, each base station could include a radio, a power amplifier, and an antenna structure. The radio could generate the reference signal, by modulating radio-frequency subcarriers or the like to represent the reference signal, encoding an identifier of the base station or its coverage area. The power amplifier could then build up power level (energy level) of modulated reference signal to a desired level. And the antenna structure could then transmit the modulated reference signal at that power level for receipt and evaluation by WCDs.

Each WCD is then correspondingly configured to receive and evaluate such base station reference signals. For instance, in an LTE network, a WCD could include an antenna structure to receive air interface transmission, and a radio to demodulate, read, and evaluate the reference signal. The WCD may thereby determine the identity of the base station or coverage area whose reference signal the WCD detects, and the WCD may determine RSRP of the reference signal, as a receive power level of the reference signal, and RSRQ of the reference signal, as a ratio of the receive power level or energy level of the reference signal to the receive power level of noise or overall spectral energy.

In practice, as noted above, each WCD that is served by a base station may be configured to evaluate RSRP and RSRQ of the base station's reference signal and RSRP and RSRQ of the reference signal from any adjacent base stations. The WCD may be configured to perform this evaluation periodically or in response to other trigger events. For instance, the WCD may be configured to evaluate RSRP and RSRQ of its serving base station periodically and to scan for and evaluate RSRP and RSRQ of adjacent base station reference signals when RSRP and/or RSRQ of the serving base station's reference signal is threshold low. Or the WCD may be configured to evaluate both RSRP and RSRQ of the serving base station and RSRP and RSRQ of each adjacent base station periodically.

Further, each such WCD may be configured to report to its serving base station the RSRP and/or RSRQ that the WCD determined for the serving base station's reference signal and perhaps for each adjacent base station's reference signal. For instance, each WCD may transmit an RF measurement report to its serving base station, specifying in the measurement report each reference signal that the WCD detects, with the associated base station or coverage identifier, and the RSRP and/or RSRQ that the WCD has computed respectively for each such reference signal. In practice, the serving base station may use these RSRP and/or RSRQ measurement reports to determine whether and when to trigger and process handover of the WCD to be served by an adjacent base station, such as when RSRP and/or RSRQ from the serving base station is threshold low and RSRP and/or RSRQ from an adjacent base station is threshold high.

In the example arrangement of FIG. 1, each base station may take various forms, and the base stations can differ in form from each other. For example, a base station could be a macro base station of the type typically including a tower-mounted antenna structure, configured to provide a wide range of coverage. Or as noted above, a base station could be a small cell (e.g., femtocell, relay base station, or the like), typically having a smaller form factor than a macro base station, perhaps being more portable and configured to provide narrower omnidirectional coverage. In operation, each base station would sit at a respective geographic location, and its location and associated attributes could be recorded in network records for reference.

Further, the base stations could be configured to engage in signaling with each other and/or with the network infrastructure, to process handover of WCDs and to share various information such as their respective geographic locations. For instance, in an LTE network, the base stations could engage in signaling with each other directly over an X2 interface and/or via a mobility management entity or other controller. And in a CDMA network, the base stations could engage in signaling with a base station controller, a radio network controller, a mobile switching center and/or other infrastructure.

Figure 2:
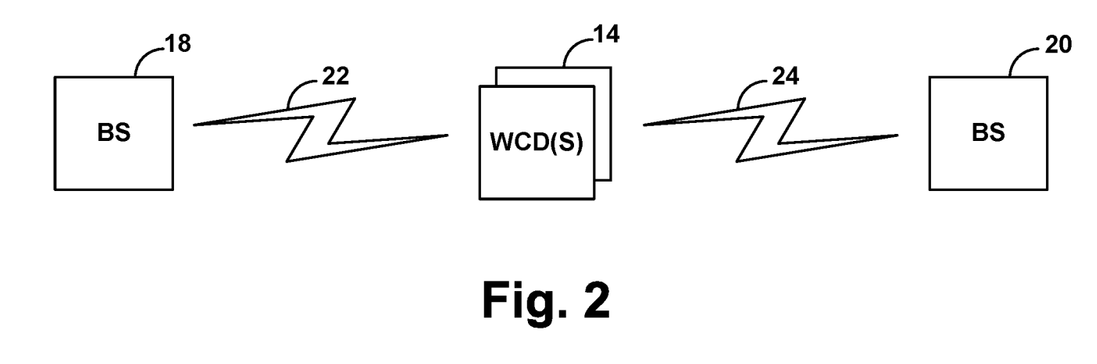
FIG. 2 is a diagram depicting an example interrelationship between base stations and WCDs.

FIG. 2 depicts a further depiction of base stations 18, 20 to help illustrate the coverage issue that can be addressed by the present disclosure. Here, the two base stations are likely small cells, each of which should provide a relatively narrow range of coverage. But the base station's coverage areas 22, 24 overlap to some extent, and one or more WCDs are positioned in the overlap area. Thus, with a WCD served by one of the base stations, the WCD would detect a reference signal from the base station, but the WCD may also detect noise resulting from reference signal transmission or other transmission from the other base station and/or from other factors. And the WCD may compute and report to its serving base station an RSRQ of the serving base station's reference signal.

In a representative network, the reference-signal transmission power of each base station, such as base stations 18 and 20, could be initially set manually or automatically as discussed above, perhaps with a goal for each base station's coverage area to extent to just past the half-way point between it and an adjacent base station (along a line extending between the base stations), so as to provide an area of overlap to facilitate WCD handover between base stations without providing undue interference to each other's coverage areas. Alternatively, the reference-signal transmission power of each base station could be set in another manner, possibly providing greater or lesser (if any) overlap with one or more adjacent base stations.

For example, each base station could determine the location of the other base station by referring to network records (e.g., to a neighbor list that specifies each adjacent base station and its geographic location, among other information) and/or through communication with the other base station. And the base station could then compute as a desired radius of its own coverage (i.e., a range of coverage out from the base station) a distance that is just more than half of the distance between its own location and the determined location of the other base station. Given this, the base station could then apply standard RF propagation models to determine a reference-signal transmission power that would likely result in reference-signal propagation with the computed coverage radius. And the base station could then set its power amplifier to provide for reference-signal transmission at the determined power level.

As noted above, the present disclosure then provides programmatically controlling reference-signal transmission power based on an evaluation coverage quality (e.g., RSRP and/or RSRQ) specifically at or near the half-way point between adjacent base stations. In particular, this control could be performed by one or both of the adjacent base stations and/or by one or more other network entities. For simplicity, the process will be described as being carried out by base station 18.

Figure 3:
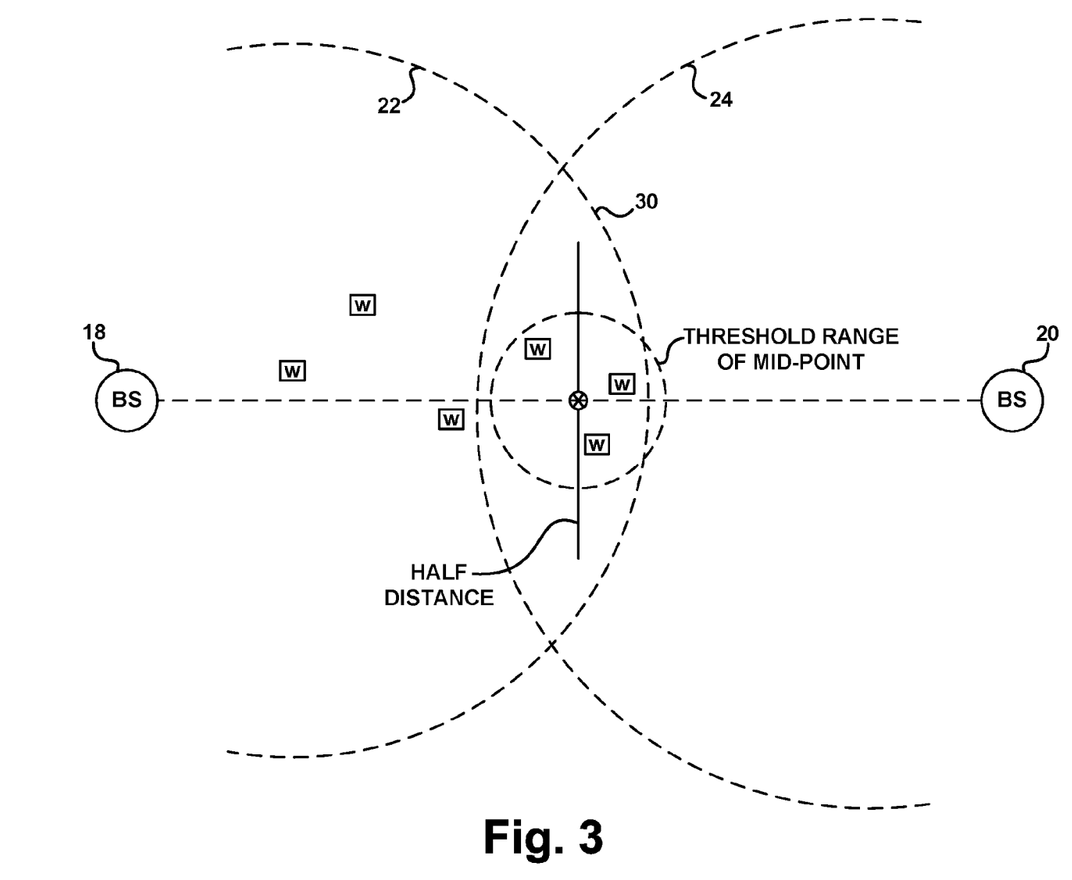
FIG. 3 is a diagram depicting an example interrelationship between base station coverage areas defined at least in part by reference-signal transmission.

FIG. 3 helps illustrate by way of example how the control process can work in practice. FIG. 3 is a variation of FIG. 2, showing adjacent base stations 18 and 20 with respective coverage areas 22, 24, and showing a resulting overlap area 30 where coverage of base station 18 overlaps with coverage of base station 20. Further, FIG. 3 depicts a number of representative WCDs served by base station 18, each labeled "W", each located at a respective location within the coverage of base station 18. Although the figure shows these WCDs at the illustrated locations, it is not necessarily the case that they are all located at their indicated respective locations at the same time as each other.

Figure 4:
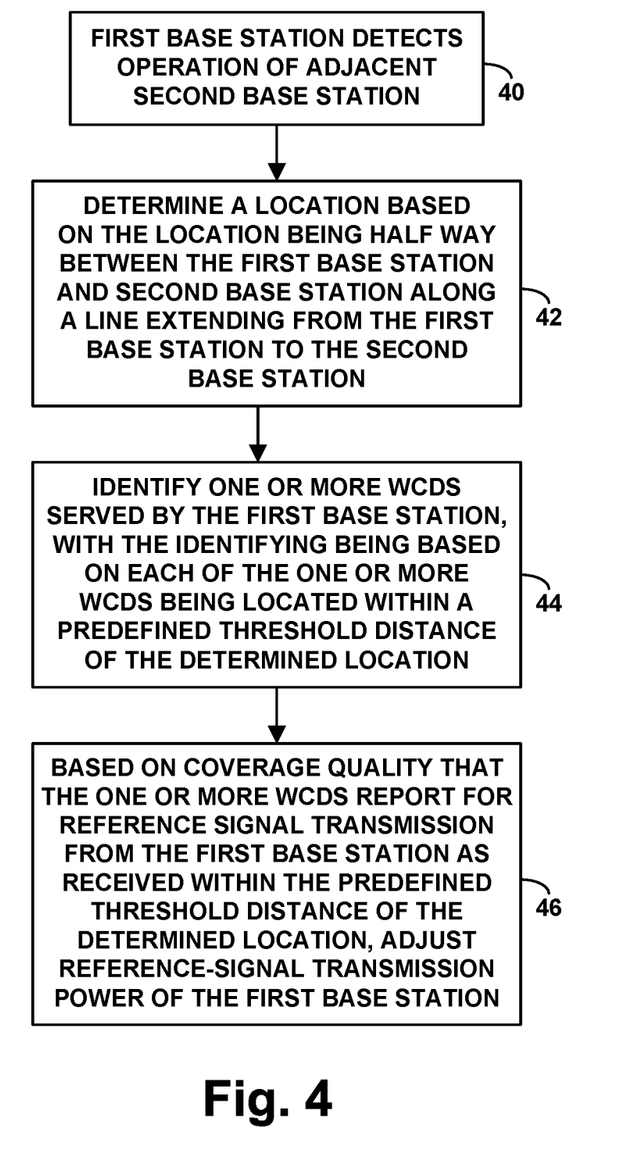
FIG. 4 is a flow chart depicting operations that can be carried out in accordance with the disclosure.

FIG. 4 is next a flow chart illustrating how a representative control process can work in practice, in the example arrangement of FIG. 3, where base station 18 is considered a "first base station" and base station 20 is considered a "second base station."

As shown in FIG. 4, at block 40, the first base station detects operation of the adjacent second base station. At block 42, a location is determined based on the location being half way between the first base station and second base station along a line extending from the first base station to the second base station. At block 44, one or more WCDs served by the first base station are then identified, with the identifying being based on each of the one or more WCDs being located within a predefined threshold distance of the determined location. And at block 46, based on coverage quality (e.g., RSRP and/or RSRQ) that the one or more WCDs report for reference signal transmission from the first base station as received within the predefined threshold distance of the determined location, the reference-signal transmission power of the first base station is adjusted.

In this process, the act of detecting operation of the adjacent second base station could take various forms. In FIG. 3, for instance, one or more WCDs served by base station 18 and located within the area of overlap between the two base stations could detect a reference signal or other signaling from base station 20 and could transmit to base station 18 a measurement report specifying the detected reference signal or other signaling, thereby informing base station 18 of the operating presence of adjacent base station 20. Alternatively, base station 18 could detect the operating presence of base station 20 by engaging in handover of one or more WCDs between the second base station and the first base station. And still alternatively, base station 18 could detect operation of adjacent base station 20 by referring to a neighbor list or other network record specifying that base station 20 is adjacent to base station 18. Other examples are possible as well.

In turn, the act of determining the location based on the location being half way between the first base station and second base station along a line extending from the first base station to the second base station could also take various forms. With reference to FIG. 3, for instance, base station 18 could first determine the location of adjacent base station 20, such as by engaging in signaling with base station 20 to request and receive from base station 20 an indication of the location, or by referring to a neighbor list or other network record of the location of base station 20. Further, base station 18 could refer to its own records to determine its own location or could determine its own location in another manner, such as by applying a global-positioning based location process or the like. Base station 18 could then determine as mid-point location a location that is half way along a line segment extending from base station 18 to base station 20. FIG. 3 depicts this mid-point location at the center of a dashed line segment between the base stations.

The act of then identifying one or more WCDs served by the first base station, based on each of the one or more WCDs each being located within a predefined threshold distance of the determined mid-point location could then take various forms as well. Again with reference to FIG. 3, for instance, base station 18 could first define the threshold distance as a circle defining a threshold range around the determined mid-point between the base stations. (In practice, the threshold distance could be predefined based on the sizes of the base stations' respective coverage areas, such as being 5% of a representative coverage radius for instance.) And base station 18 could then identify WCDs served by base station that are located within that determined threshold range of the mid-point, again not necessarily all at the same time as each other.

At issue in this process is the coverage quality (e.g., RSRP and/or RSRQ) reported within the threshold range around the determined mid-point. Thus, the act of identifying one or more served WCDs each located within that threshold range could involve receiving coverage quality reports of WCDs that are located within the threshold range.

To facilitate this in practice within the arrangement of FIG. 3, by way of example, base station 18 could be configured to determine the geographic location of each WCD reporting coverage quality for reference-signal transmission from base station 18. For instance, applying known location-determination techniques, base station 18 could regularly track the location of each of its served WCDs, and when base station 18 receives a coverage quality report from a served WCD, base station 18 could than map the reported coverage quality with the current location of the reporting WCD. Alternatively or additionally, each WCD served by base station 18 could apply a known location-determination technique to determine its own location and could provide an indication of its location to base station 18. For instance, each WCD could include in its measurement report to base station 18, along with its indication of coverage quality, an indication of its current location, and base station 18 could likewise map the reported coverage quality with the location.

Given this information, base station 18 could thus compare the location of each WCD with the threshold range around the determined mid-point, to determine which if any of its served WCDs are each located within the threshold range around the determined mid-point. And more particularly, base station 18 could thereby determine which if any coverage quality measurements reported by its served WCDs for reference signal transmission from base station 18 are for the reference signal as received within the threshold range around the determined mid-point.

In turn, the act of adjusting reference-signal transmission power of the first base station based on coverage quality that the one or more WCDs report for reference signal transmission from the first base station within the predefined threshold distance of the determined location could also take various forms.

By way of example, again with reference to FIG. 3, this could involve, for each of the one or more identified WCDs, base station 18 receiving at least one respective report indicating coverage quality of the WCD for the reference-signal transmission from the first base station, which could be part of the process of identifying the WCD as one of the one or more WCDs or could occur after identifying the WCD as one of the one or more WCDs. Further, for each such WCD, base station 18 could compare the WCD's reported coverage quality with a target coverage quality (e.g., target RSRP and/or target RSRQ), which could be a coverage quality deemed by engineering design to be optimal for service at the coverage edge.

Base station 18 could then determine if a predefined threshold extent of the reported coverage quality for reference signal transmission from the first base station as received within the predefined threshold distance of the determined location are threshold different than the target coverage quality and, if so, could responsively adjust its reference-signal transmission power.

For instance, base station 18 could determine if the coverage quality reported by at least a predefined threshold percentage (e.g., over 50%) of the one or more identified WCDs are threshold higher than the target coverage quality and, if so, base station 18 could responsively decrement its reference-signal transmission power. Or base station 18 could determine if the coverage quality reported by at least a similar predefined threshold percentage of the one or more identified WCDs are threshold lower than the target coverage quality and, if so, base station 18 could responsively increment its reference-signal transmission power. Through this process as a whole, which could be performed iteratively, base station 18 could thus help to keep its reference-signal transmission power at a level that results in desired coverage quality at the coverage edge.

Figure 5:
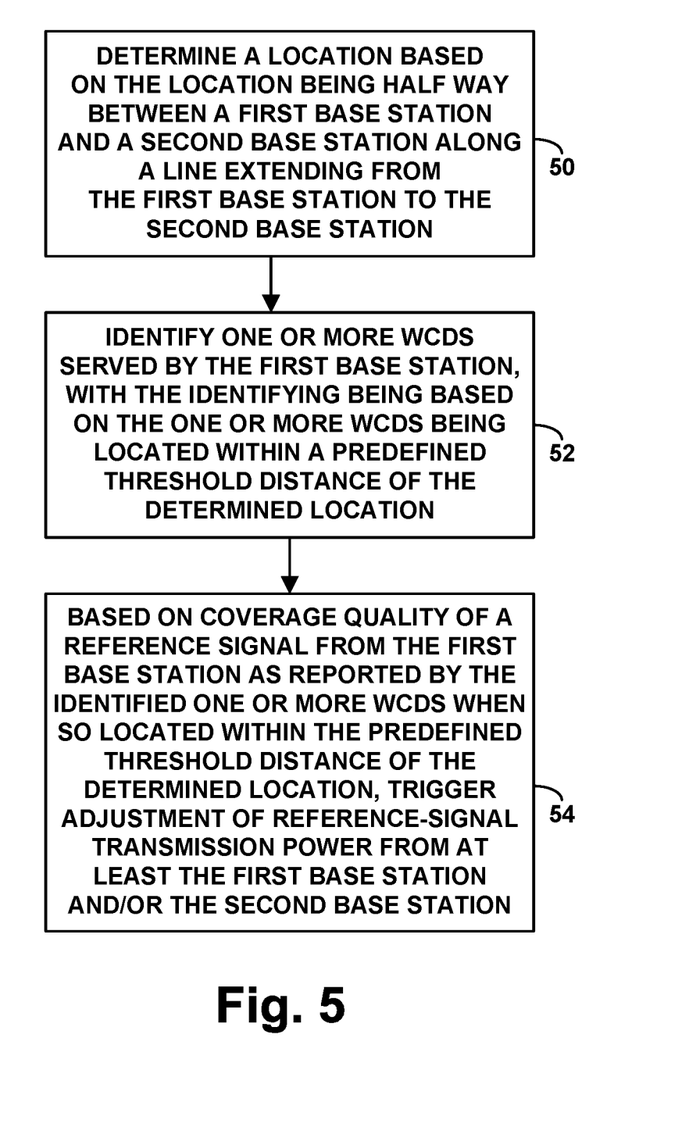
FIG. 5 is another flow chart depicting operations that can be carried out in accordance with the disclosure.

FIG. 5 is next another flow chart depicting operations that can be carried out in accordance with the present disclosure, here to control reference-signal transmission power of the first base station (e.g., base station 18) and/or reference-signal transmission power of the second base station (e.g., base station 20). As with the discussion above, these operations could be carried out by base station 18 and/or by one or more other entities.

As shown in FIG. 5, at block 50, the method includes determining a location based on the location being half way between the first base station and the second base station along a line extending from the first base station to the second base station. At block 52, the method then further includes identifying one or more WCDs served by the first base station, with the identifying being based on the one or more WCDs being located within a predefined threshold distance of the determined location. And at block 54, the method includes, based on coverage quality (e.g., RSRP and/or RSRQ) of a reference signal from the first base station as reported by the identified one or more WCDs when so located within the predefined threshold distance of the determined location, triggering adjustment of reference-signal transmission power from at least the first base station and/or the second base station.

Here, the operations at blocks 50 and 52 could be carried out largely as described above.

In turn, the act of then triggering adjustment of reference-signal transmission power based on coverage quality from the first base station as reported by the identified one or more WCDs when so located within the predefined threshold distance of the determined location could take various forms. By way of example, this could involve (a) determining that at least a predefined threshold extent of the coverage quality reported by the one or more WCDs is below a target coverage quality as discussed above and (b) responsive to determining that at least the predefined threshold extent of the coverage quality reported by the one or more WCDs is below a target coverage quality, (i) increasing reference-signal transmission power from the first base station and/or (ii) decreasing reference-signal transmission power from the second base station. For instance, with reference to FIG. 3, base station 18 could responsively increment its own reference-signal transmission power, and/or base station 18 could signal to base station 20 (e.g., send a command signal to base station 20) to cause base station 20 to decrement reference-signal transmission power from base station 20.

Alternatively, this could involve (a) determining that at least a predefined threshold extent of the coverage quality reported by the one or more WCDs is above a target coverage quality as discussed above and (b) responsive to determining that at least the predefined threshold extent of the coverage quality reported by the one or more WCDs is above the target coverage quality, (i) decreasing reference-signal transmission power from the first base station and/or (ii) increasing reference-signal transmission power from the second base station. For instance, with reference to FIG. 3, base station 18 could responsively decrement its own reference-signal transmission power, and/or base station 18 could signal to base station 20 (e.g., send a command signal to base station 20) to cause base station 20 to increment reference-signal transmission power from base station 20.

Figure 6:
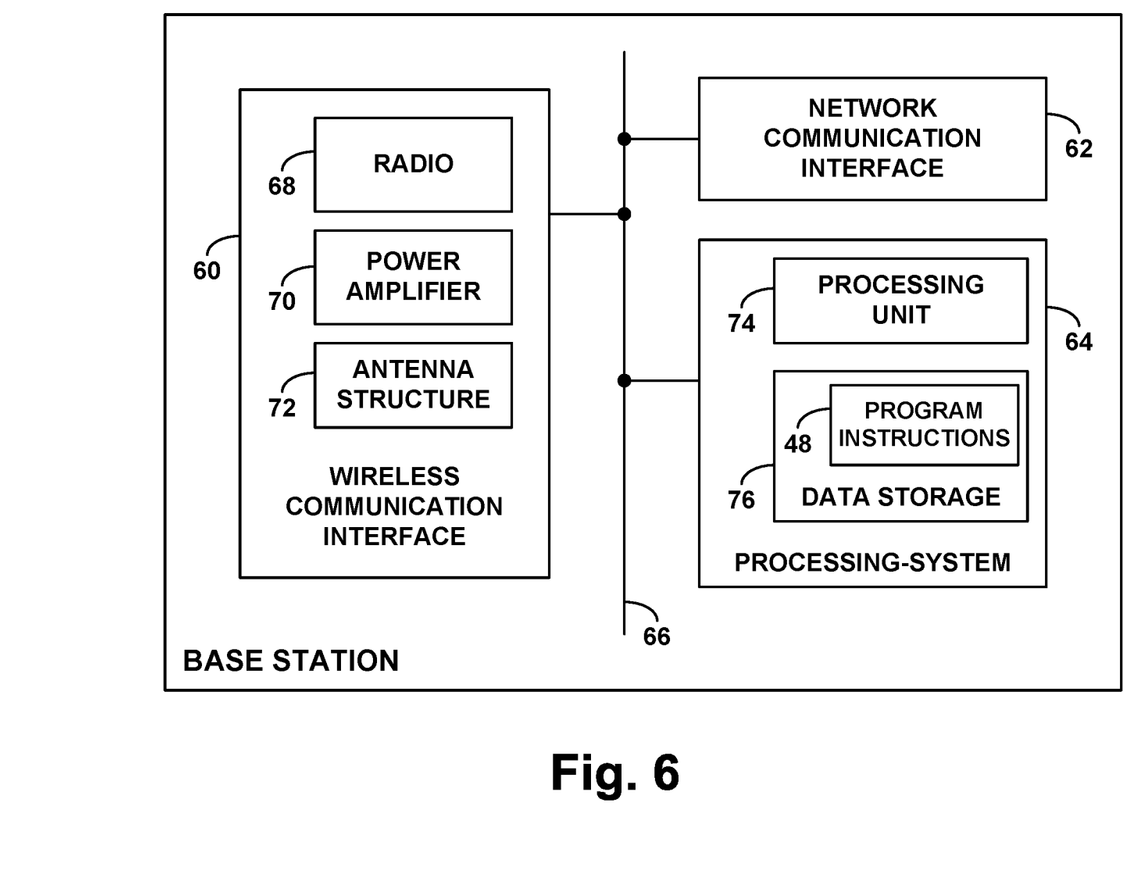
FIG. 6 is a simplified block diagram of an example base station operable in accordance with the disclosure.

Finally, FIG. 6 is a simplified block diagram of an example base station, showing some of the components that could be included in a base station in an example implementation. As shown in FIG. 6, the base station includes a wireless communication interface 60, a network communication interface 62, and a processing system 64. These components are shown communicatively linked together by a system bus or other communication link 66, but it will be understood that the components could alternatively be integrated together or distributed in various ways. For instance, aspects of the processing system 64 could be provided in a chipset that implements functions of the wireless communication interface 60, and components could be otherwise integrated or arranged. Other examples are possible as well.

As shown, wireless communication interface 60 could include a radio 68, an adjustable power amplifier 70, and an antenna structure (e.g., one or more antennas) 72, cooperatively facilitating air interface communication so that the base station can serve one or more WCDs via the wireless communication interface. Network communication interface 62 could then include a wired or wireless network interface, such as an Ethernet interface, through which the base station could communicate with other entities of a RAN such as with adjacent base stations and network infrastructure. And processing system 64 could include a processing unit (one or more microprocessors) 74, non-transitory data storage 76, and program instructions 78 stored in the non-transitory data storage and executable by the processing unit to carry out various operations described herein.

Exemplary embodiments have been described above. Those skilled in the art will understand, however, that changes and modifications may be made to these embodiments without departing from the true scope and spirit of the invention.

What is claimed is:

1. A method of controlling reference-signal transmission power of a first base station, the method comprising:
    detecting, by the first base station, operation of an adjacent second base station;
    determining a mid-point location between the first base station and the second base station, wherein the mid-point location is half way along a line segment extending from the first base station to the second base station;
    identifying one or more wireless communication devices (WCDs) served by the first base station, wherein the identifying of the one or more WCDs is based on each of the one or more WCDs being located within a predefined threshold distance of the determined mid-point location; and
    based on coverage quality that the one or more WCDs report for reference signal transmission from the first base station within the predefined threshold distance of the determined mid-point location, adjusting power of the reference-signal transmission from the first base station.

2. The method of claim 1, wherein detecting operation of the adjacent second base station comprises receiving one or more reports indicating that at least one WCD detected signaling from the second base station while served by the first base station.

3. The method of claim 1, wherein detecting operation of the adjacent second base station comprises engaging by the first base station in WCD handover between the second base station and the first base station.

4. The method of claim 1, further comprising:
    determining by the first base station a location of the second base station,
    wherein determining the mid-point location between the first base station is based on the determined location of the second base station.

5. The method of claim 4, wherein determining the location of the second base station comprises receiving in signaling from the second base station an indication of the location of the second base station.

6. The method of claim 1, wherein identifying the one or more WCDs based on each of the one or more WCDs being located within the predefined threshold distance of the determined mid-point location comprises:
    receiving from each of the one or more WCDs a respective indication of location of the WCD, and determining that the indicated respective location of each of the one or more WCDs is within the predefined threshold distance of the determined mid-point location.

7. The method of claim 1, further comprising receiving from each of the one or more WCDs a respective report indicating (i) coverage quality of the WCD and (ii) location of the WCD,
    wherein identifying the one or more WCDs based on each of the one or more WCDs being located within the predefined threshold distance of the determined mid-point location is based on the location indicated in the respective report from each of the one or more WCDs, and
    wherein adjusting power of the reference-signal transmission from the first base station based on coverage quality that the one or more WCDs report for reference signal transmission from the first base station as received within the predefined threshold distance of the determined mid-point location is based on the reported coverage quality indicated in the respective report from each of the one or more WCDs.

8. The method of claim 1, wherein adjusting power of the reference-signal transmission from the first base station based on coverage quality that the one or more WCDs report for reference signal transmission from the first base station as received within the predefined threshold distance of the determined mid-point location comprises:
    for each of the one or more WCDs, receiving at least one respective report indicating coverage quality of the WCD for the reference-signal transmission from the first base station, and comparing the indicated coverage quality with a target coverage quality; and
    decreasing the power of the reference-signal transmission from the base station in response to determining based on the comparing that a threshold extent of the reported coverage quality is higher than the target coverage quality.

9. The method of claim 1, wherein adjusting power of the reference-signal transmission from the first base station based on coverage quality that the one or more WCDs report for reference signal transmission from the first base station as received within the predefined threshold distance of the determined mid-point location comprises:
    for each of the one or more WCDs, receiving at least one respective report indicating coverage quality of the WCD for the reference-signal transmission from the first base station, and comparing the indicated coverage quality with a target coverage quality; and
    increasing the power of the reference-signal transmission from the base station in response to determining based on the comparing that a threshold extent of the reported coverage quality is lower than the target coverage quality.

10. The method of claim 1, performed iteratively.

11. In a communication system including a first base station and a second base station, a method of controlling reference-signal transmission power, the method comprising:
    determining a mid-point location between the first base station and the second base station, wherein the mid-point location is half way along a line segment extending from the first base station to the second base station;
    identifying one or more WCDs served by the first base station, wherein the identifying of the one or more WCDs is based on the one or more WCDs being located within a predefined threshold distance of the determined mid-point location; and
    based on reference signal receive quality (RSRQ) from the first base station as reported by the identified one or more WCDs when so located within the predefined threshold distance of the determined mid-point location, triggering adjustment of the reference-signal transmission power from at least one of the first base station or the second base station.

12. The method of claim 11, carried out by the first base station.

13. The method of claim 11, wherein triggering adjustment of the reference-signal transmission power based on RSRQ from the first base station as reported by the identified one or more WCDs when so located within the predefined threshold distance of the determined mid-point location comprises:
    determining that at least a predefined threshold extent of the RSRQ reported by the one or more WCDs is below a target RSRQ; and
    responsive to determining that at least the predefined threshold extent of the RSRQ reported by the one or more WCDs is below the target RSRQ, taking at least one action selected from the group consisting of (i) increasing reference-signal transmission power from the first base station and (ii) decreasing reference-signal transmission power from the second base station.

14. The method of claim 13, wherein decreasing reference-signal transmission power from the second base station comprises signaling from the first base station to the second base station to cause the second base station to decrease reference-signal transmission power from the second base station.

15. The method of claim 11 wherein triggering adjustment of reference-signal transmission power based on RSRQ from the first base station as reported by the identified one or more WCDs when so located within the predefined threshold distance of the determined mid-point location comprises:
    determining that at least a predefined threshold extent of the RSRQ reported by the one or more WCDs is above a target RSRQ; and
    responsive to determining that at least the predefined threshold extent of the RSRQ reported by the one or more WCDs is above the target RSRQ, taking at least one action selected from the group consisting of (i) decreasing reference-signal transmission power from the first base station and (ii) increasing reference-signal transmission power from the second base station.

16. The method of claim 15, wherein increasing reference-signal transmission power from the second base station comprises signaling from the first base station to the second base station to cause the second base station to increase reference-signal transmission power from the second base station.

17. In a wireless communication network comprising a first base station and a second base station, wherein each of the first base station and second base station is configured to broadcast a respective reference signal, a processing system programmed to carry out operations comprising:
    determining a mid-point location between the first base station and the second base station, wherein the mid-point location is half way along a line segment extending from the first base station to the second base station;
    identifying one or more WCDs served by the first base station, wherein the identifying of the one or more WCDs is based on the one or more WCDs being located within a predefined threshold distance of the determined mid-point location; and
    based on reference signal receive quality (RSRQ) from the first base station as reported by the identified one or more WCDs when so located within the predefined threshold distance of the determined mid-point location, adjusting reference-signal transmission power from at least one of the first base station or the second base station.

18. The processing system of claim 17, wherein the processing system is part of the first base station.

19. The processing system of claim 17, wherein adjusting reference-signal transmission power from at least one of the first base station or the second base station based on RSRQ from the first base station as reported by the identified one or more WCDs when so located within the predefined threshold distance of the determined mid-point location comprises:
    determining that the RSRQ of each of at least a predefined threshold percentage of the one or more WCDs is below a target RSRQ; and
    responsive to determining that the RSRQ of each of at least the predefined threshold percentage of the one or more WCDs is below the target RSRQ, taking at least one action selected from the group consisting of (i) increasing reference-signal transmission power from the first base station and (ii) decreasing reference-signal transmission power from the second base station.

20. The processing system of claim 17, wherein adjusting reference-signal transmission power from at least one of the first base station or the second base station based on RSRQ from the first base station as reported by the identified one or more WCDs when so located within the predefined threshold distance of the determined mid-point location comprises:
    determining that the RSRQ of each of at least a predefined threshold percentage of the one or more WCDs is above a target RSRQ; and responsive to determining that the RSRQ of each of at least the predefined threshold percentage of the one or more WCDs is above the target RSRQ, taking at least one action selected from the group consisting of (i) decreasing reference-signal transmission power from the first base station and (ii) increasing reference-signal transmission power from the second base station.

\* \* \* \* \*